(12) United States Patent
Sakai et al.

(10) Patent No.: US 6,539,220 B1
(45) Date of Patent: Mar. 25, 2003

(54) RADIO BASE STATION PROGRAM UPDATE METHOD AND APPARATUS NOT REQUIRING UPDATE HOST COMPUTER

(75) Inventors: Hiroshi Sakai, Tokyo (JP); Shigeru Gorin, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/448,488

(22) Filed: Nov. 24, 1999

(30) Foreign Application Priority Data

Dec. 21, 1998 (JP) ............................................. 10-363560

(51) Int. Cl.⁷ ................................................ H04M 3/00
(52) U.S. Cl. ....................................... 455/420; 455/524
(58) Field of Search ................................ 455/418, 419, 455/420, 502, 524; 375/356

(56) References Cited

U.S. PATENT DOCUMENTS 4,718,109 A * 1/1988 Breeden et al.
5,068,877 A * 11/1991 Near et al. .................. 375/107
5,809,426 A * 9/1998 Radojevic et al.

FOREIGN PATENT DOCUMENTS

| JP | 6-105352 | 4/1994 |
| JP | 7-87543 | 3/1995 |
| JP | 10-40189 | 2/1998 |
| JP | 10-224286 | 8/1998 |
| JP | 10-243446 | 9/1998 |

* cited by examiner

*Primary Examiner*—Nguyen T. Vo
(74) *Attorney, Agent, or Firm*—McGinn & Gibb, PLLC

(57) ABSTRACT

A program updating apparatus for a radio base station includes a plurality of non-management radio base stations and a management radio base station. Each of the plurality of non-management radio base stations has a first program. The management radio base station stores a second program to which the first program is updated. The management radio base station transmits the second program to at least one of the plurality of non-management radio base stations such that the first program is updated to the second program. The non-management radio base station having the second program, as a first master radio base station, transmits the second program to another of the plurality of non-management radio base stations, as a first slave radio base station, which does not have the second program such that the first program is updated to the second program.

6 Claims, 15 Drawing Sheets

RADIO BASE STATION PROGRAM UPDATE METHOD AND APPARATUS NOT REQUIRING UPDATE HOST COMPUTER

BACKGROUND OF THE INVENTION

1. Field of the Invention

The present invention relates to a program updating apparatus for a radio base station and method as the same, which update a program of a radio base station used in a private wireless telephone using a private branch switching unit.

2. Description of the Related Art

New services such as a character communication and the like, are developed one after another, as a PHS (Personal Handy-phone System) service. Usually, an addition of a new service requires a change of a program for a radio base station (CS). Typically, the radio base station is installed at a place, such as a ceiling or the like, which is difficult for a hand to reach, by considering the characteristic of an electrical wave transmission. For this reason, once it is installed, it is difficult to carry out a program change work, such as a change of ROM and the like. So, several program download methods are proposed in order to update a program of a radio base station.

An example of a program download method to a conventional radio base station is disclosed in Japanese Laid Open Patent Application (JP-A-Heisei 7-87543) (a first conventional technique). In this conventional method, in order to carry out a program download at a high speed, a high speed line is installed between the base stations, and a download program is transferred on this high speed line.

Japanese Laid Open Patent Application (JP-A-Heisei 10-40189) (a second conventional technique) discloses a method in which a host computer transfers a download program to a radio base station and then the radio base station sequentially transfers a program to a next radio base station.

The first conventional technique has a problem that when a new program to be downloaded is transferred in a master base station, it requires an external memory as well as a high speed line.

Also, the second conventional technique has the following problem. That is, it requires a host computer. Moreover, a radio base station carrying out the download sequentially downloads a program to a next radio base station. Thus, if there are a large number of radio base stations, a period corresponding to the number is needed.

The present invention is accomplished in view of the above mentioned problems. Therefore, an object of the present invention is to provide a radio base station program download method which can easily update a program for many radio base stations in a short time without requiring a special facility.

The following techniques are disclosed.

Japanese Laid Open Patent Application (JP-A-Heisei 6-105352) discloses a download method to a base station in a mobile switch system, as follows. The mobile switch system containing a plurality of base stations, base station controllers, mobile switches, monitors and control terminals connected to the monitors is used to prepare interface converters in the monitors and the mobile switches for carrying out the relay processes between the control terminals and the base station controllers. Then, an interface switch is carried out in a lower layer. After completion of connection of the lower layer, the control terminal carries out a communication control in a layer. The preparation of the download between the control terminal and the base station controller is checked to then send out a download file from the control terminal.

Japanese Laid Open Patent Application (JP-A-Heisei 10-224286) discloses a method for updating a system file of a mobile communication system and the base stations thereof, as follows. At least one file transfer base station is prepared at each of blocks, each having a plurality of base stations. A system file is transmitted from a maintenance apparatus through a fixing network to each file transfer base station. The file transfer base station receiving the system file sequentially transfers the system file through the fixing network to the other base stations in each block.

Japanese Laid Open Patent Application (JP-A-Heisei 243446) discloses a multi-base station download method, as follows. In a simple type portable telephone system of a multi-base station method, at a time of download, a higher rank apparatus reports a download instruction of a master base station and a slave base station to the master base station. The master base station reports a download start instruction to respective slave base stations. Accordingly, when the master base station and the respective slave base stations establish a download data link between the higher rank apparatus and them and then receive the download data and further validate a reception download data and thereby detect a normal reception, the slave base station reports a download result information to the master base station, and then the master base station reports the end of the downloads of the master base station and the slave base station to the higher rank apparatus. Thus, the downloads become possible in the master base station and the slave base station, respectively, individually and simultaneously.

SUMMARY OF THE INVENTION

The present invention has been made to solve the above-described problems of the conventional program updating apparatus for a radio base station. An object of the present invention is to provide a program updating apparatus for a radio base station which can easily update a program for many radio base station in short time without requiring special facility.

In order to achieve an aspect of the present invention, a program updating apparatus for a radio base station includes a plurality of non-management radio base stations wherein each of the plurality of non-management radio base stations has a first program and a management radio base station storing a second program to which the first program is updated, and wherein the management radio base station transmits the second program to at least one of the plurality of non-management radio base stations such that the first program is updated to the second program, and the non-management radio base station having the second program, as a first master radio base station transmits the second program to another of the plurality of non-management radio base stations as a first slave radio base station which does not have the second program such that the first program is updated to the second program.

In this case, the first slave radio base station receiving the second program from the first master radio base station as a second master radio base station transmits the second program to another of the plurality of non-management radio base stations as a second slave radio base station which does not have the second program.

Also in this case, each of the first and second master radio base station has a master right, and the master right is propagated such that all of the plurality of non-management radio base stations undergoes the master radio base station Further in this case, at a substantially same time when the first master radio base station transmits the second program to the first slave radio base station the first master radio base station as a second master radio base station transmits the second program to the first slave radio base station as a second slave radio base station In order to achieve another aspect of the present invention, a program updating apparatus further includes a switching unit to which each of the plurality of non-management radio base stations and the management radio base station are connected, and wherein the switching unit has a management table and refers to the management table to connect each of the plurality of non-management radio base stations and the management radio base station and the management table has a first memory area in which an identification number data assigned to each of the plurality of non-management radio base stations is stored and a second memory area in which a data indicative of a state of each of the plurality of non-management radio base stations is stored, the state data indicating whether or not the non-management radio base station has the second program and whether or not the non-management radio base station is transmitting or receiving the second program, and the switching unit refers to the second memory area to retrieve the state data indicating that the non-management radio base station does not have the second program and the state data indicating that the non-management radio base station has the second program, and selects the master radio base station and the slave radio base station based on the retrieved result to connect the selected master radio base station to the selected slave radio base station In this case, an identification number data assigned to the management radio base station is further stored in the first memory area the state data of the management radio base station is further stored in the second memory area and the management table further has a third memory area in which a data is stored, the data being indicative of a communication destination when the second program should be transmitted.

Also in this case, each of the plurality of non-management radio base stations and the management radio base station have a substantially same circuit configuration other than a fact that the second program is stored in the management radio base station in advance.

Further in this case, each of the management radio base station and the plurality of non-management radio base stations further has a mode setting unit setting as a operation mode, any one of a management radio base station mode a master radio base station mode and a slave radio base station mode and wherein the program updating apparatus further has a switching unit to which the each non-management radio base station and the management radio base station are connected, and wherein the mode setting unit of the management radio base station sets to the management radio base station mode in advance to output a first data indicating that the management radio base station is in the management radio base station mode to the switching unit and the switching unit outputs a mode setting signal to designate the master radio base station and the slave radio base station in response to the first data, and the mode setting unit of each non-management radio base station sets to any one of the master radio base station mode and the slave radio base station mode based on the mode setting signal.

In this case, each of the management radio base station and the plurality of non-management radio base stations further has a mode setting unit setting as a operation mode, any one of a management radio base station mode a master radio base station mode and a slave radio base station mode and wherein the program updating apparatus further has a switching unit to which the each non-management radio base station and the management radio base station are connected, and wherein the management radio base station is connected to the switching unit at a predetermined position, the switching unit identifies the management radio base station based on the position, and the switching unit outputs a mode setting signal to designate the master radio base station and the slave radio base station in response to the first data, and the mode setting unit of each non-management radio base station sets to any one of the master radio base station mode and the slave radio base station mode based on the mode setting signal.

Also in this case, the management radio base station further has a report unit reporting that the management radio base station is transmitting the second program and that a transmission of the second program to all of the plurality of non-management radio base stations is completed.

In order to achieve still another aspect of the present invention, a program updating method of a radio base station, includes (a) providing a plurality of non-management radio base stations wherein each of the plurality of non-management radio base stations has a first program, (b) providing a management radio base station storing a second program to which the first program is updated, (c) setting any one of the plurality of non-management radio base stations as an N-th (N is an integer equal to or more than 1) slave radio base station (d) transmitting the second program to the N-th slave radio base station from the management radio base station to update the first program of the N-th slave radio base station to the second program, (e) setting the N-th slave radio base station having the second program as an M-th (M is an integer equal to or more than 1) master radio base station, (f) setting any one of the plurality of non-management radio base stations which does not have the second program, as an (N+1)-th slave radio base station, and (g) transmitting the second program to the (N+1)-th slave radio base station from the M-th master radio base station to update the first program of the (N+1)-th slave radio base station to the second program.

In this case, a program updating method further includes (h) setting the (N+1)-th slave radio base station having the second program as an (M+1)-th master radio base station (i) setting any one of the plurality of non-management radio base stations which does not have the second program as an (N+2)-th slave radio base station and (j) transmitting the second program to the (N+2)-th slave radio base station from the (M+1)-th master radio base station to update the first program of the (N+2)-th slave radio base station to the second program.

Also in this case, a program updating method further includes (k) setting the (N+2)-th slave radio base station as the (N+1)-th slave radio base station and setting the (M+1)-th master radio base station as the M- th master radio base station to repeat the respective steps of (g) to (j) such that all of the plurality of non-management radio base stations have the second program.

Further in this case, a first flow including the steps of (c) and (d), a second flow including the steps of (e) to (g) and a third flow including the steps of (h) to (j) are performed in parallel to each other.

In this case, a program updating method further includes (L) assigning an identification number to each of the plurality of non-management radio base stations and the management radio base station and wherein the (c) step includes setting a non-management radio base station having a lowest identification number of the plurality of non-management radio base stations as the N-th slave radio base station and the (f) step includes setting a non-management radio base station having a lowest identification number of the plurality of non-management radio base stations as the (N+1)-th slave radio base station and the (i) step includes setting a non-management radio base station having a lowest identification number of the plurality of non-management radio base stations as the (N+2)-th slave radio base station Also in this case, a program updating method further includes (M) providing a management table wherein the management table stores an identification number assigned to each of the plurality of non-management radio base stations and a data indicating whether or not each non-management radio base station has the second program, (N) referring to the management table to generate a referring result, (O) retrieving, based on the referring result, a non-management radio base station having a lowest identification number of the plurality of non-management radio base stations which have the second program, as the master radio base station (P) retrieving, based on the referring result, a non-management radio base station having a lowest identification number of the plurality of non-management radio base stations which do not have the second program, as the slave radio base station and (Q) transmitting the second program to the retrieved slave radio base station from the retrieved master radio base station to update the first program to the second program.

Further in this case, a program updating method further includes (R) reporting a completion of an operation of updating a program when all of the plurality of non-management radio base stations have the second program.

In order to achieve yet still another aspect of the present invention, a program updating method of a radio base station, includes (S) providing a plurality of radio base stations wherein each of the plurality of radio base stations has a first program, (T) providing a second program to which the first program is updated, (U) transmitting the second program to any one of the plurality of radio base stations to update the first program to the second program, and (V) transmitting the second program to one of the plurality of radio base stations which does not have the second program, from the radio base station having the second program, to update the first program to the second program.

In order to achieve another aspect of the present invention, a computer readable recording medium for recording a program for a process includes (a) providing a plurality of non-management radio base stations wherein each of the plurality of non-management radio base stations has a first program, (b) providing a management radio base station storing a second program to which the first program is updated, (c) setting any one of the plurality of non-management radio base stations as an N-th (N is an integer equal to or more than 1) slave radio base station (d) transmitting the second program to the N-th slave radio base station from the management radio base station to update the first program of the N-th slave radio base station to the second program, (e) setting the N-th slave radio base station having the second program as an M-th (M is an integer equal to or more than 1) master radio base station (f) setting any one of the plurality of non-management radio base stations which does not have the second program, as an (N+1)-th slave radio base station and (g) transmitting the second program to the (N+1)-th slave radio base station from the M-th master radio base station to update the first program of the (N+1)-th slave radio base station to the second program.

In this case, a computer readable recording medium further includes (h) setting the (N+1)-th slave radio base station having the second program as an (M+1)-th master radio base station (i) setting any one of the plurality of non-management radio base stations which does not have the second program as an (N+2)-th slave radio base station and (j) transmitting the second program to the (N+2)-th slave radio base station from the (M+1)-th master radio base station to update the first program of the (N+2)-th slave radio base station to the second program.

Also in this case, a computer readable recording medium further includes (k) setting the (N+2)-th slave radio base station as the (N+1)-th slave radio base station and setting the (M+1)-th master radio base station as the M-th master radio base station to repeat the respective steps of (g) to (j) such that all of the plurality of non-management radio base stations have the second program.

BRIEF DESCRIPTION OF THE DRAWINGS

A more complete understanding of the teachings of the present invention may be acquired by referring to the accompanying figures, in which like reference numbers indicate like features and wherein.

DESCRIPTION OF THE PREFERRED EMBODIMENTS

An embodiment of the present invention will be described below with reference to the attached drawings.

A. Configuration of Embodiment

Figure 1:
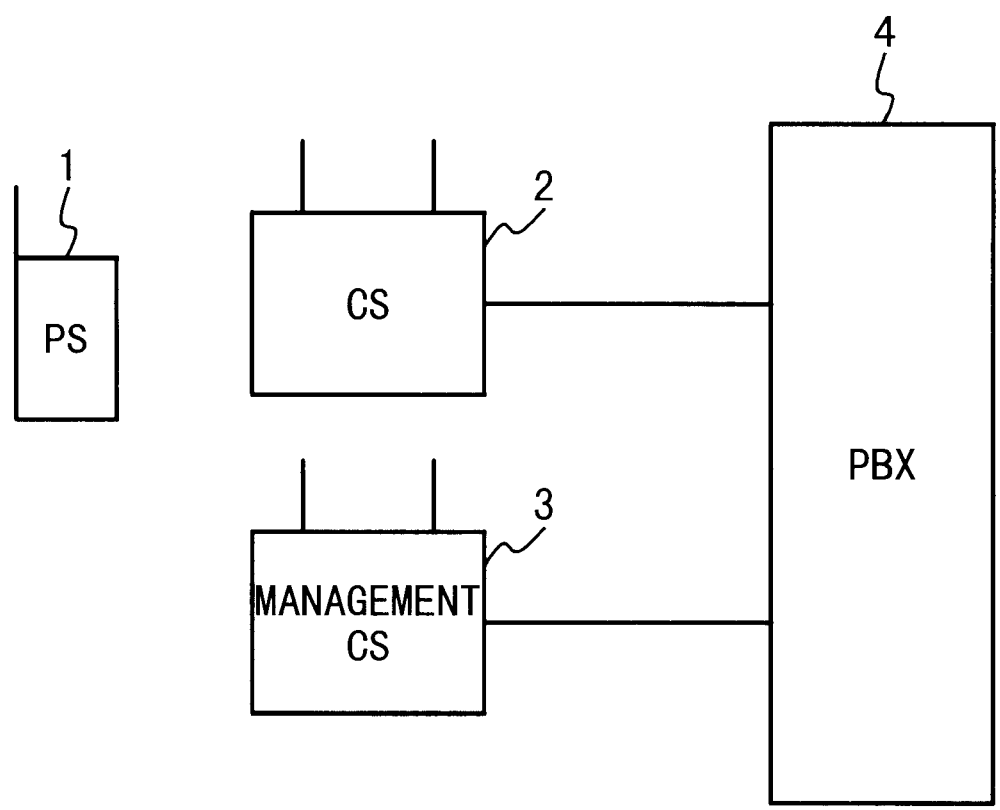
FIG. 1 is a block diagram showing a whole circuit configuration of a first embodiment in the present invention.

FIG. 1 is a block diagram showing a whole configuration according to a first embodiment in the present invention. As shown in FIG. 1, this embodiment is provided with a private PHS personal machine (PS) 1, a private PHS radio base (cell) station (CS) 2, a management radio base station (management CS) 3 and a private branch exchange (PBX) (switching unit) 4 which are respectively operated with each program control.

The private PHS personal machine 1 has a function for carrying out a radio communication with the private PHS radio base station 2. The private PHS radio base station 2 has a function for carrying out a radio communication with the private PHS personal machine 1 and a communication with the private branch switching unit 4. The private branch switching unit 4 has a switching function and provides a private PHS service as a whole system.

The management radio base station 3 and the private PHS radio base station 2 have the same circuit configuration except the difference described later. Here, FIG. 2 is a block diagram showing the configuration of the management radio base station 3 and the private PHS radio base station 2.

Figure 2:
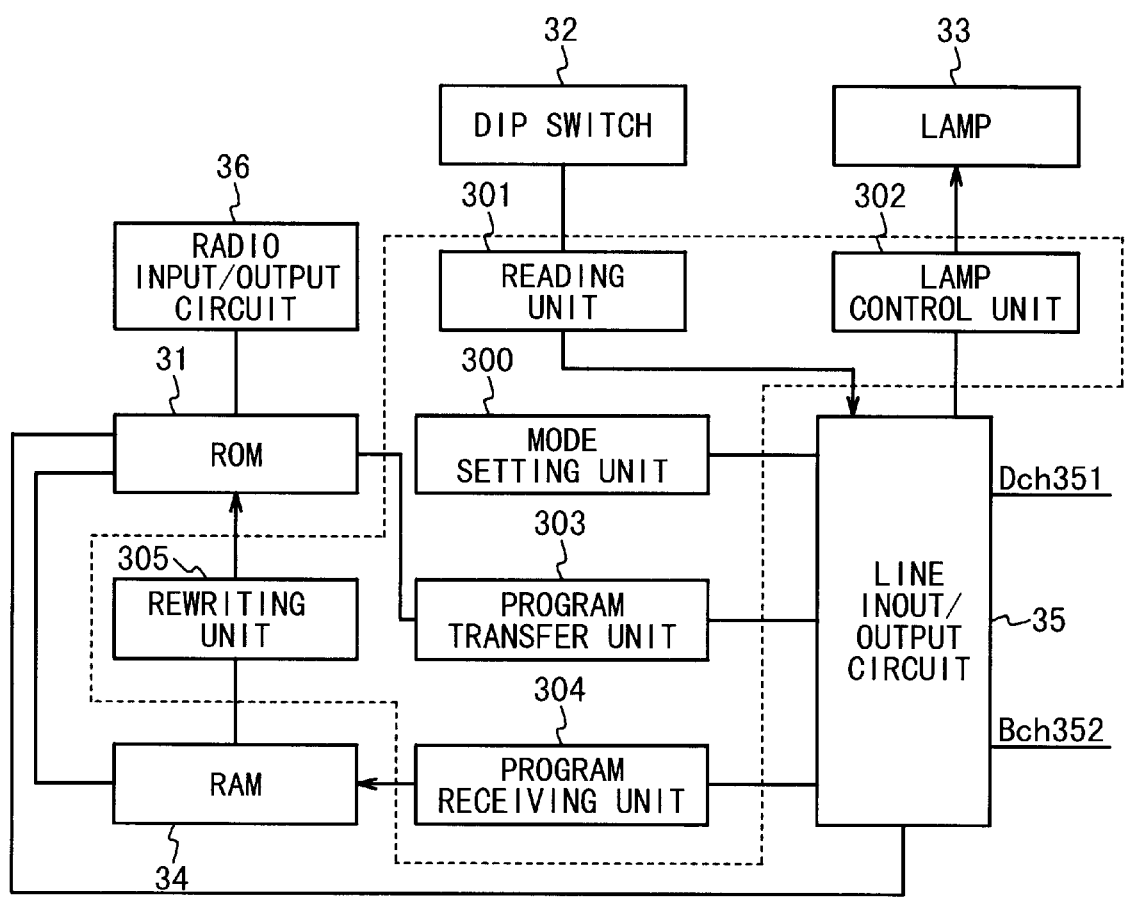
FIG. 2 is a block diagram showing a circuit configuration of a management radio base station and a private PHS base station in the first embodiment.

In FIG. 2, each of the management radio base station 3 and the private PHS radio base station 2 has a ROM 31, a dip switch 32, a lamp 33, a RAM 34, a line input/output circuit 35 and a radio input/output circuit 36.

Each of the private PHS radio base station 2 and the management radio base station 3 is connected to the private branch switching unit 4 through ISDN (Integrated Service Digital Network) which is a line interface of PHS. The line input/output circuit 35 controls a control channel 351 (Dch) and a call channel 352 (Bch) of an ISDN base interface (2B+D). A program is stored in the ROM 31.

The dip switch 32 is switched to any one of a management CS mode and a normal operation mode to determine an operational state of its radio base station. A reading unit 301 reads the mode to which the dip switch 32 is switched, and then outputs the read result to the line input/output circuit 35. If the dip switch 32 is switched to the management CS mode, its radio base station functions as the management radio base station 3. If the dip switch 32 is switched to the normal operation mode, its radio base station functions as the private PHS radio base station 2. The radio input/output circuit 36 controls the radio communication with the private PHS personal machine 1. The RAM 34 transiently stores a program downloaded from the other radio base stations. The RAM 34 is used to operate a software of a usual PHS base station.

The difference between the private PHS radio base station 2 and the management radio base station 3 is as follows. In the management radio base station 3, a program (hereafter, referred to as a download program) to be downloaded to all the radio base stations contained in the private branch switching unit 4 is already written to the ROM 31, in a factory for producing a radio base station in advance.

Each of the management radio base station 3 and the private PHS radio base station 2 has a mode setting unit 300. The mode setting unit 300 establishes that its radio base station (the intra-office) is operated at any one of the normal operation mode, the management CS mode, a master CS mode and a slave CS mode. The mode setting unit 300 sets the above-mentioned mode in accordance with the set condition of the dip switch 32, or an instruction received through the control channel 31 from the private branch switching unit 4.

In the management CS mode, the reading unit 301 and a lamp control unit 302 are started up. The reading unit 301 identifies the set condition of the dip switch 32, and reports a fact that the intra-office (its radio base station) is set as the management radio base station 3, through the control channel 351 to the private branch switching unit 4. The lamp control unit 302 receives a state signal indicative of a state of the intra-office (whether the intra-office is in a state under the download or the download has been completed) through the control channel 351 from the private branch switching unit 4. The lamp control unit 302, when receiving the state signal, represents the state indicated by the state signal by using a flash state (pattern) of the lamp 33.

In the management CS mode and the master CS mode, a program transfer unit 303 is started up. The program transfer unit 303 outputs a download program data stored in the ROM 31 to the line input/output circuit 35, in response to a request from the private branch switching unit 4. The download program data outputted to the line input/output circuit 35 is sent (downloaded) to the other radio base stations through the call channel 352 and the private branch switching unit 4. The program transfer unit 303, after the download program data is sent, reports a transfer completion signal indicating the completion of sending (transferring) the data, through the line input/output circuit 35, the call channel 352 and the private branch switching unit 4 to the other radio base stations.

In the slave CS mode, a program receiving unit 304 and a rewriting unit 305 are started up. The program receiving unit 304 receives the download program data downloaded through the private branch switching unit 4 and the call channel 352. The program receiving unit 304 stores in the RAM 34 the received download program data. The rewriting unit 305, when receiving the transfer completion signal, rewrites the download program stored in the RAM 34, to the ROM 31. At this time, its radio base station is started up in accordance with the new (rewritten) program of the ROM 31, and reports the starting up in accordance with the new program, through the control channel 351 to the private branch switching unit 4.

Figure 3:
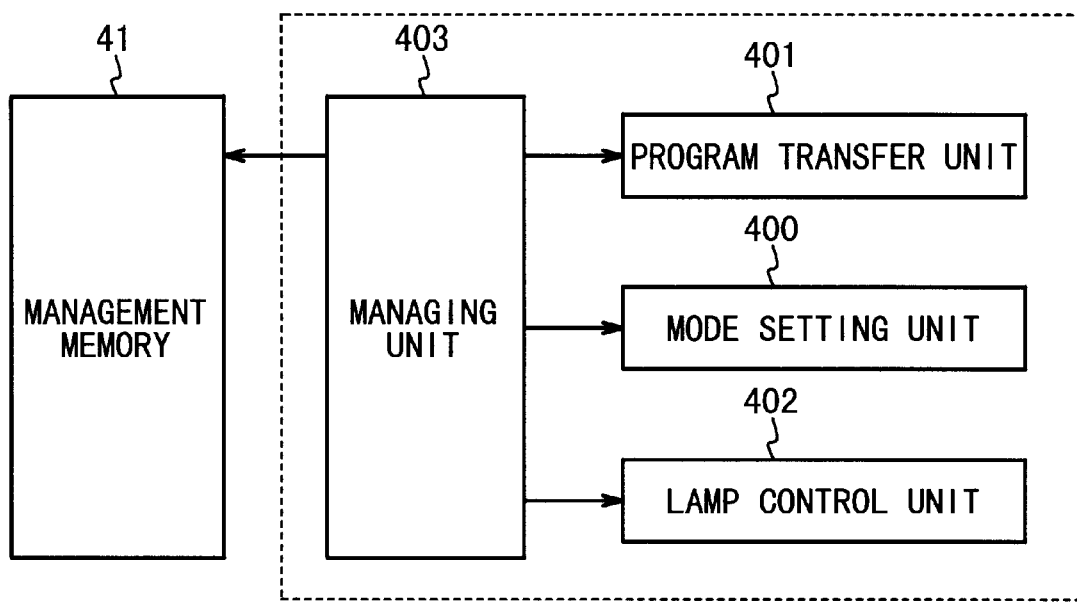
FIG. 3 is a block diagram showing a circuit configuration of a private branch switching unit in the first embodiment.
Figure 4:
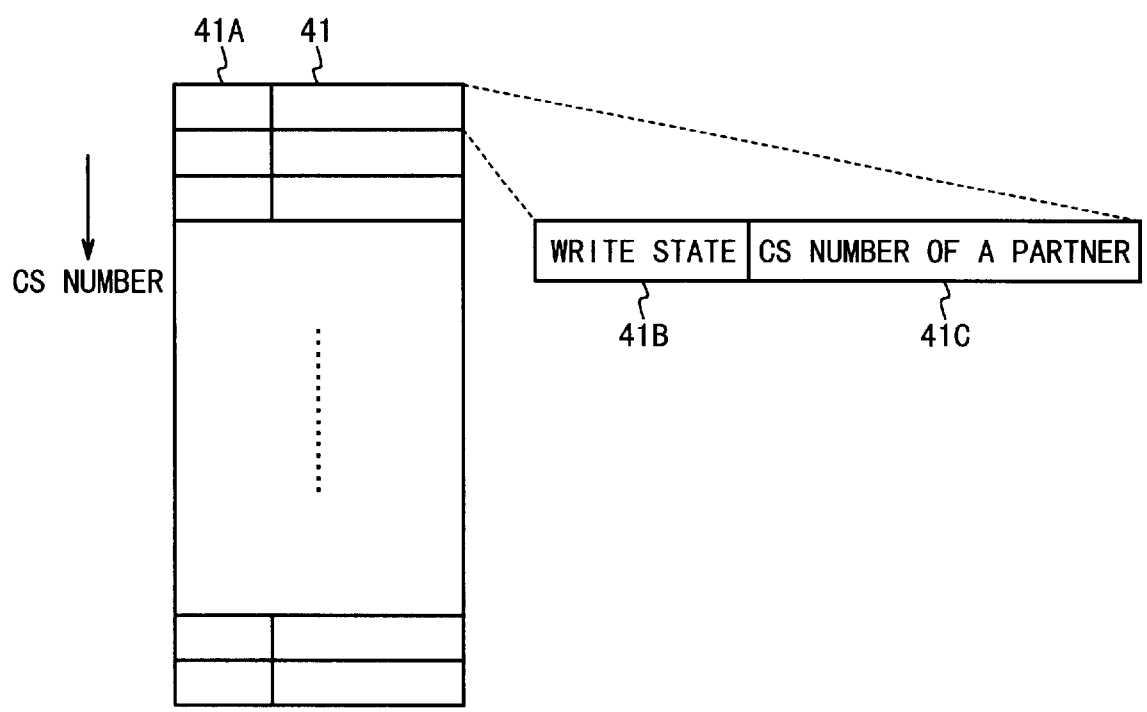
FIG. 4 is a concept view showing a data configuration of a management memory in the first embodiment.

FIG. 3 is a block diagram showing the circuit configuration of the private branch switching unit 4. The private branch switching unit 4 includes a mode setting unit 400, a program transfer unit 401, a lamp control unit 402, a managing unit 403 and a CS download management memory 41.

The CS download management memory 41 stores therein the data to carry out this download as well as the data to carry out the usual switching function including the PHS. The mode setting unit 400 indicates an operation mode to the radio base station. The program transfer unit 401 connects the management radio base station 3 and the private PHS radio base station 2 to each other, or a master CS and a slave CS to each other, through the call channel 352, and then transfers a program. The lamp control unit 402 instructs the management radio base station 3 or the master CS to turn on and off the lamp.

The managing unit 403 manages and identifies the respective radio base stations in the CS download management memory 41 by using a CS number (identifier) and always checks the states of the respective radio base stations. The managing unit 403 updates the data to indicate the write states of the respective radio base stations, in the CS download management memory 41. Accordingly, the managing unit 403 enables the slave CS to which the program is rewritten, to function as the master CS. The managing unit 403 can complete the download to all the radio base stations in a short time by instructing and managing the download between the plurality of radio base stations.

The management memory 41 has a plurality of first memory areas 41A, a plurality of second memory areas 41B and a plurality of third memory areas 41C. The first memory area 41A stores therein a CS number given to each of all the private PHS radio base stations 2 and the management radio base stations 3 connected to the private branch switching unit 4. The CS number is the number used in the private branch switching unit 4 in order that the private branch switching unit 4 specifies the radio base station.

Each of the second memory area 41B and the third memory area 41C is provided so as to correspond to the first memory area 41A. The second memory area 41B stores the data indicative of a write state of the download program data of the radio base stations 2, 3 corresponding to the CS number. As the write state, there are three states of a not-yet-written state, a in-writing state and an completion of writing state. The third memory area 41C stores a CS number of a partner (connection destination) to which a write operation is applied, when the radio base stations 2, 3 corresponding to the CS number are in writing (under the write operation).

B. Operation of Embodiment

The operations of this embodiment will be described below in detail.

At first, an actual work carried out by a maintenance man is described. A maintenance man of a PBX system selects a radio base station in which a download program is written in advance to its ROM 31 in a CS producing factory or the like. A dip switch 32 of the selected radio base station is set to the management CS mode. The radio base station set to the management CS mode is connected to the private branch switching unit 4 as the management radio base station 3. At this time, it is desirable that the management radio base station 3 is installed in a management room of the private branch switching unit 4 because the installation is easy and the lamp is visible.

The lamp 33 indicative of the operation mode and the transmission state is mounted in the radio base station, as shown in FIG. 2. After the management radio base station 3 is connected to the private branch switching unit 4, the management radio base station 3 starts the flash of the lamp 33, in order to represent the management radio base station 3 is in the in-writing state. This flash pattern is a pattern evidently different from the normal operation state so that it can be evidently recognized by the maintenance man.

After the completion of the downloads to all the radio base stations, the lamp 33 of the management radio base station 3 carries out a flash operation at another different pattern. Since this flash pattern is checked by the maintenance man, it is recognized that the downloads are completed for all the radio base stations. Accordingly, the management radio base station 3 is removed to then complete the download work.

The operations of the radio base station (management radio base station 3) set to the management CS mode will be described below with reference to FIG. 3.

The radio base station in which the download program is written in advance to the ROM 31 in a producing factory is turned on and started up by the connection to the private branch switching unit 4. The reading unit 301 of the radio base station reads a state of the dip switch 32. The mode setting unit 300 identifies an operation mode of the radio base station, in accordance with the read result of the reading unit 301 (Steps A1 and A2 of FIG. 5). As the identified result, if the radio base station is not set to the management CS mode, it is operated as the normal operation mode, namely, as the private PHS radio base station 2 (Step A3 of FIG. 5).

On the other hand, if the radio base station is set to the management CS mode, it is operated as the management radio base station 3, as follows. The mode setting unit 300 reports the fact that the intra-office (its radio base station) is started up as the management radio base station 3 (a starting up report signal of the management radio base station) to the private branch switching unit 4 through the line input/output circuit 35, by using the control channel 351 (Step A4 of FIG. 5). The lamp control unit 302 turns on and off the lamp 33 at a flash pattern indicative of the start of the in- writing (download) state (Step A5 of FIG. 5).

Figure 5:
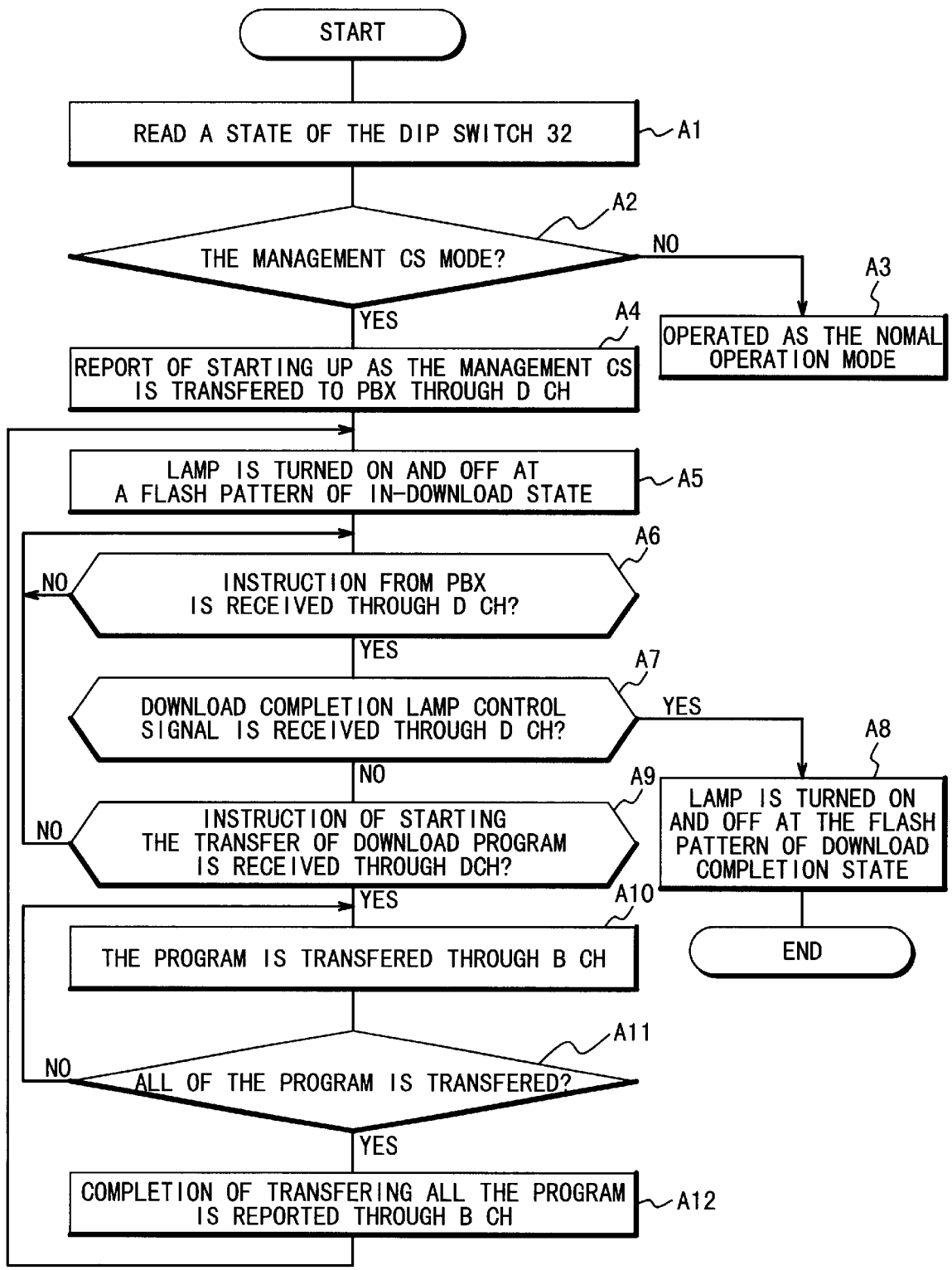
FIG. 5 is a flowchart describing operations of a radio base station (management radio base station) set at a management CS mode in the first embodiment.

Next, the radio base station becomes at a state of waiting for an instruction from the private branch switching unit 4 through the control channel 351 (Step A6 of FIG. 5). If an instruction (download completion lamp control signal) indicative of a control of a download completion lamp outputted from the private branch switching unit 4 is received through the control channel 351, the lamp control unit 302 turns on and off the lamp 33 at a flash pattern indicative of the completion of all the downloads (Steps A7 and A8 of FIG. 5).

If an instruction of starting a transfer of the download program outputted from the private branch switching unit 4 is received through the control channel 351, the program transfer unit 303 starts the transfer of the download program stored the ROM 31, to the slave CS through the private branch switching unit 4 by using the call channel 352 (Steps A9 and A10). The reason why it is transferred by using the call channel 352 is that it can be transferred faster than the control channel 351.

The management radio base station 3, when completing the transfer of all of the download program, outputs the transfer completion signal through the call channel 352 to the private branch switching unit 4. The management radio base station 3 becomes at a state of waiting for the instruction from the private branch switching unit 4 in the line input/output circuit 35 through the control channel 351 (Steps A11 and A12 of FIG. 5). The management radio base station 3, if again receiving the instruction of starting transferring the program (Step A9—YES), executes the operations on and after the step A10. On the other hand, the management radio base station 3, if receiving the download completion lamp control signal (Step A7—YES), executes the operations on and after the step A8.

The operations of the radio base station (slave CS) set to the slave CS mode will be described below with reference to FIG. 6. The private PHS radio base station 2 receives an instruction of setting to the slave CS mode (a slave CS set signal) through the control channel 351 from the private branch switching unit 4 by using the line input/output circuit 35 (Step B1 of FIG. 6). The private PHS radio base station 2, if receiving the slave CS set signal, uses the mode setting unit 300 to then set the intra-office (the private PHS radio base station 2, itself) to the slave CS mode, and also transmits a slave set report signal through the control channel 351 to the private branch switching unit 4 (Step B2 of FIG. 6). Accordingly, the private PHS radio base station 2 (slave CS) set to the slave CS becomes at a state of waiting for a reception of the download program.

The program receiving unit 304 of the slave CS receives the download program data through the call channel 352, and then stores it in the RAM 34 (Step B3). The slave CS, if receiving the transfer completion signal, uses the rewriting unit 305 to then write the data stored in the RAM 34 to the ROM 31 (Steps B4 and B5). If the rewrite of the ROM 31 is completed, the slave CS is started up in accordance with its new program (re-starting up). The slave CS outputs a signal indicative of the starting up (a rewrite completion signal of the ROM 31) from the line input/output circuit 35 through the control channel 351 to the private branch switching unit 4, on the basis of the new program (Steps B6 and B7 of FIG. 6).

The operations of the radio base station (master CS) set to the master CS mode will be described below with reference to FIG. 7. The private PHS radio base station 2 receives an instruction of setting to a master CS (a master CS set signal) through the control channel 351 from the private branch switching unit 4 by using the line input/output circuit 35 (Step C1 of FIG. 7). At this time, the private PHS radio base station 2, if receiving the master CS set signal, uses the mode setting unit 300 to then set the intra-office to the master CS mode, and also outputs a master set completion signal through the control channel 351 to the private branch switching unit 4 (Step C2 of FIG. 7).

The private PHS radio base station 2 (master CS) receives a instruction of starting the transfer of the program through the control channel 351 from the line input/output circuit 35 (Step C3—YES). At this time, the master CS uses the program transfer unit 303 to then transfer the download program stored in the ROM 31 of the intra-office through the call channel 352 and the private branch switching unit 4 to the slave CS by using the line input/output circuit 35 (Step C4).

The master CS, if the transfer of all the download program is completed, reports the transfer completion signal through the call channel 352 by using the line input/output circuit 35. Then, the master CS becomes at a state of waiting for the instruction from the private branch switching unit 4 transmitted through the control channel 351, in the line input/output circuit 35 (Steps C5 and C6).

The operations of the private branch switching unit 4 will be described below with reference to FIGS. 8 to 11. The private branch switching unit 4 receives a management CS starting up report (a management radio base station starting up report signal, and refer to the step A4 of FIG. 5) outputted from the management radio base station 3 (Step D1 of FIG. 8). At this time, the private branch switching unit 4 recognizes that a CS download is started, in accordance with the received signal.

The private branch switching unit 4 stores a data indicative of the in-writing state in the second memory area 41B corresponding to the management radio base station 3, in the CS download management memory 41. The private branch switching unit 4 stores a data indicative of the not-yet-written state in the second memory area 41B of all the private PHS radio base stations 2 other than the management radio base station 3, in the CS download management memory 41 (Step D2).

Next, the private branch switching unit 4 retrieves the CS download management memory 41, and detects the private PHS radio base station 2 of the not-yet-written state. The mode setting unit 400 of the private branch switching unit 4 transmits a slave mode set instruction to the detected private PHS radio base station 2 through the control channel 351 (refer to the step D3 of FIG. 8, and the step B1 of FIG. 6). Accordingly, all the private PHS radio base stations 2 other than the management radio base station 3 become the slave CS.

Figure 6:
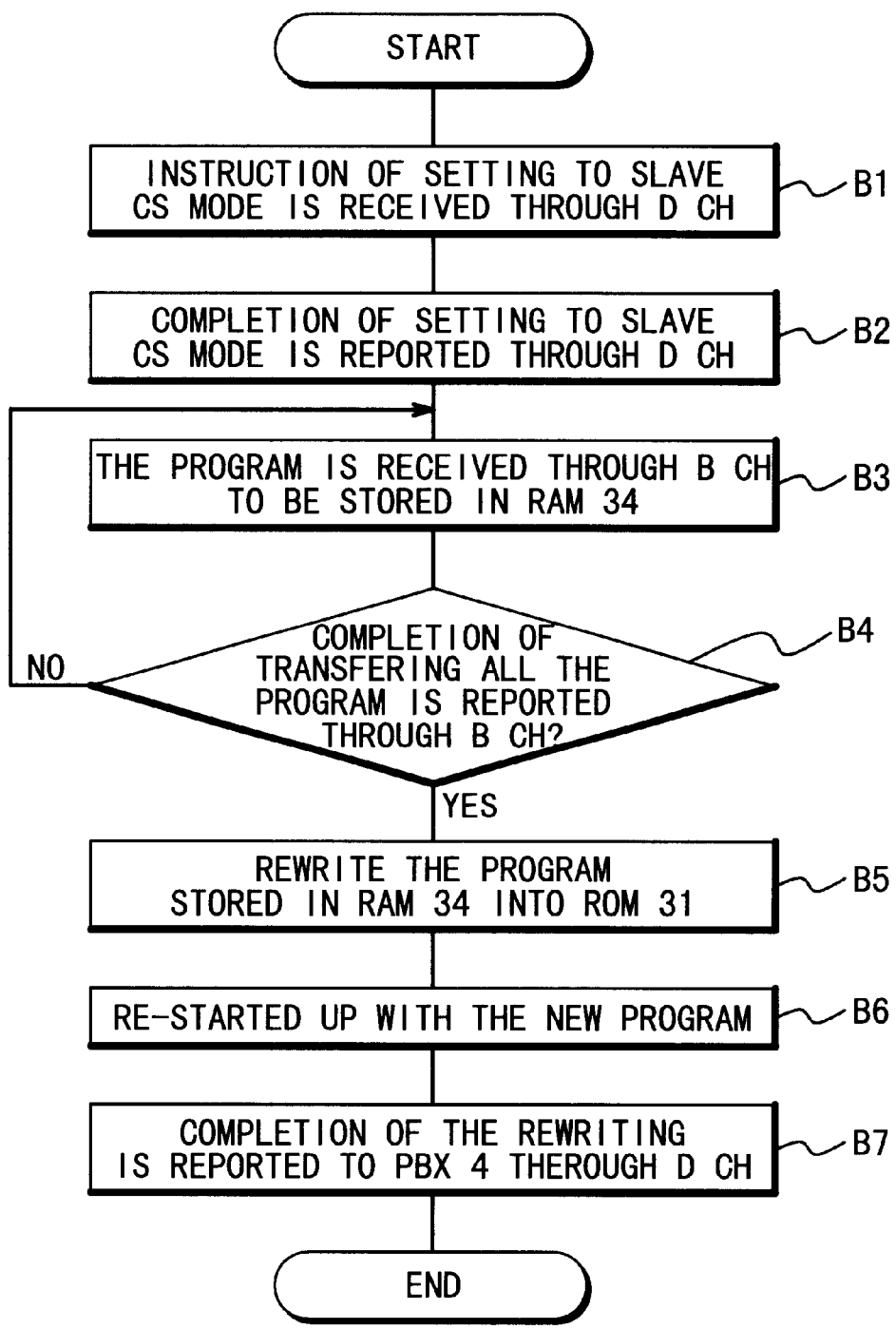
FIG. 6 is a flowchart describing operations of a radio base station (slave CS) set at a slave CS mode in the first embodiment.
Figure 8:
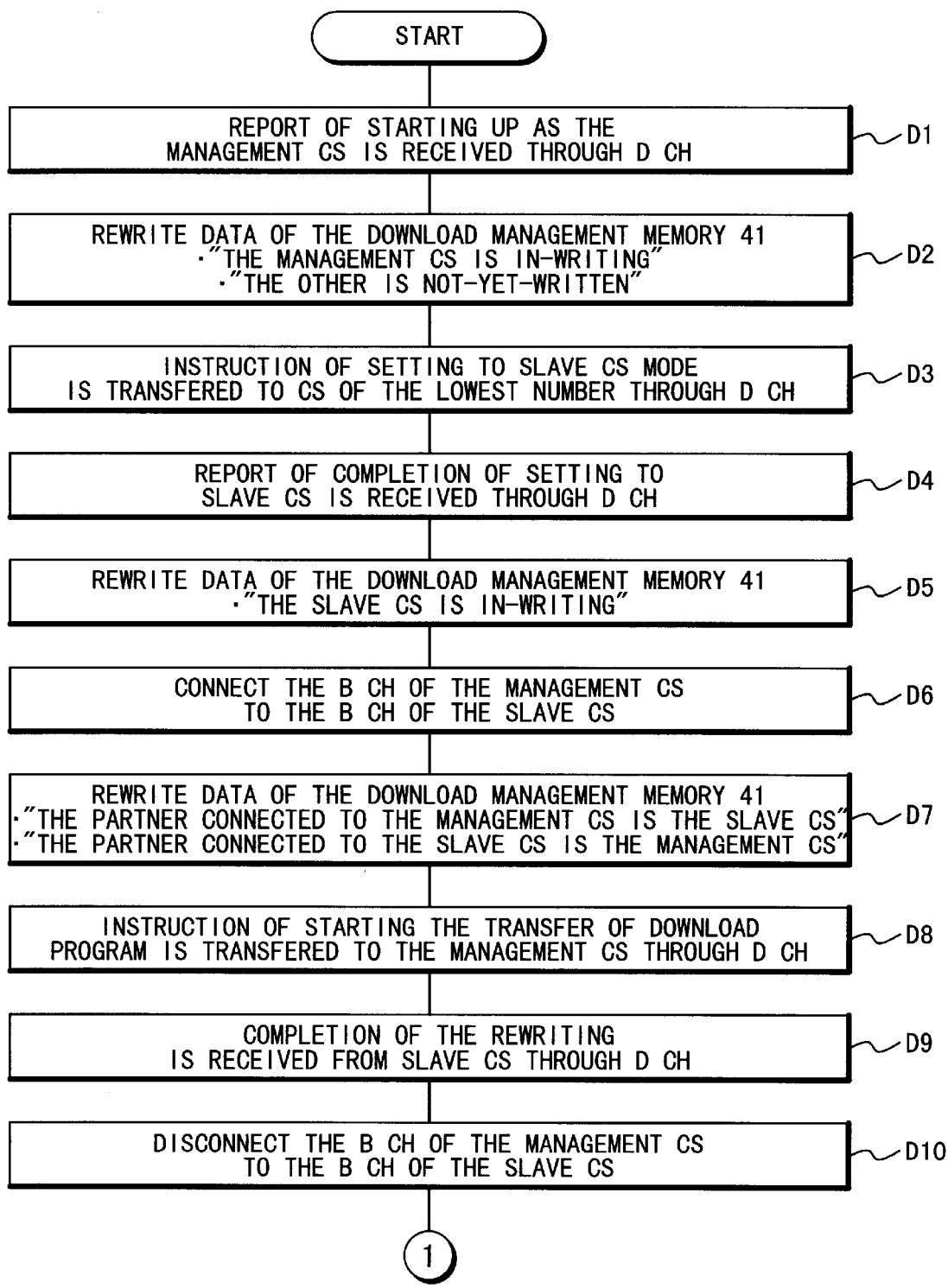
FIG. 8 is a flowchart describing a part of the operations of the private branch switching unit in the first embodiment.

The private branch switching unit 4 receives the slave set report signal through the control channel 351 from the slave CS (Step D4 of FIG. 8, and Step B2 of FIG. 6). At this time, the private branch switching unit 4 stores the data indicative of the in-writing state in the second memory area 41B of the private PHS radio base station 2 corresponding to the received slave set report signal, in the CS download management memory 41 (Step D5 of FIG. 8). The private branch switching unit 4 connects the call channel 352 of the management radio base station 3 to one of the slave CS (Step D6 of FIG. 8), and then sets a CS number of a connection destination for the third memory area 41C of the CS download management memory 41 (Step D7 of FIG. 8).

Next, the private branch switching unit 4 sends the instruction of starting the transfer of the download program through the control channel 351 to the management radio base station 3 (Step D8 of FIG. 8, and Step A9 of FIG. 5). Accordingly, the download (transferring) of the download program is started between the management radio base station 3 and the slave CS.

Next, the private branch switching unit 4 receives a rewrite completion signal from the slave CS through the control channel 351 (Step D9 of FIG. 8). At this time, the private branch switching unit 4 refers to the CS download management memory 41 to then disconnect the connection of the call channel 352 between the slave CS corresponding to the received rewrite completion signal and the management radio base station 3 (Step D10). The private branch switching unit 4 rewrites the data of each second memory area 41B of the slave CS corresponding to the received rewrite completion signal and the management radio base station 3, into the data indicative of the completion of writing state (Step D11 of FIG. 9).

Next, the private branch switching unit 4 uses the managing unit 403 to then retrieve the CS download management memory 41 and further detect the private PHS radio base station 2 in which the data of the second memory area 41B is at the not-yet-written state (Step D12).

As the detected result, the absence of the private PHS radio base station 2 at the not-yet-written state implies the completion of the downloads to all the private PHS radio base stations 2. Thus, in this case, the private branch switching unit 4 uses the mode setting unit 400 to then transmit an instruction indicative of the starting up at the normal mode through the control channel 351 to all the private PHS radio base stations 2 except the management radio base station 3 (Step D13).

Figure 10:
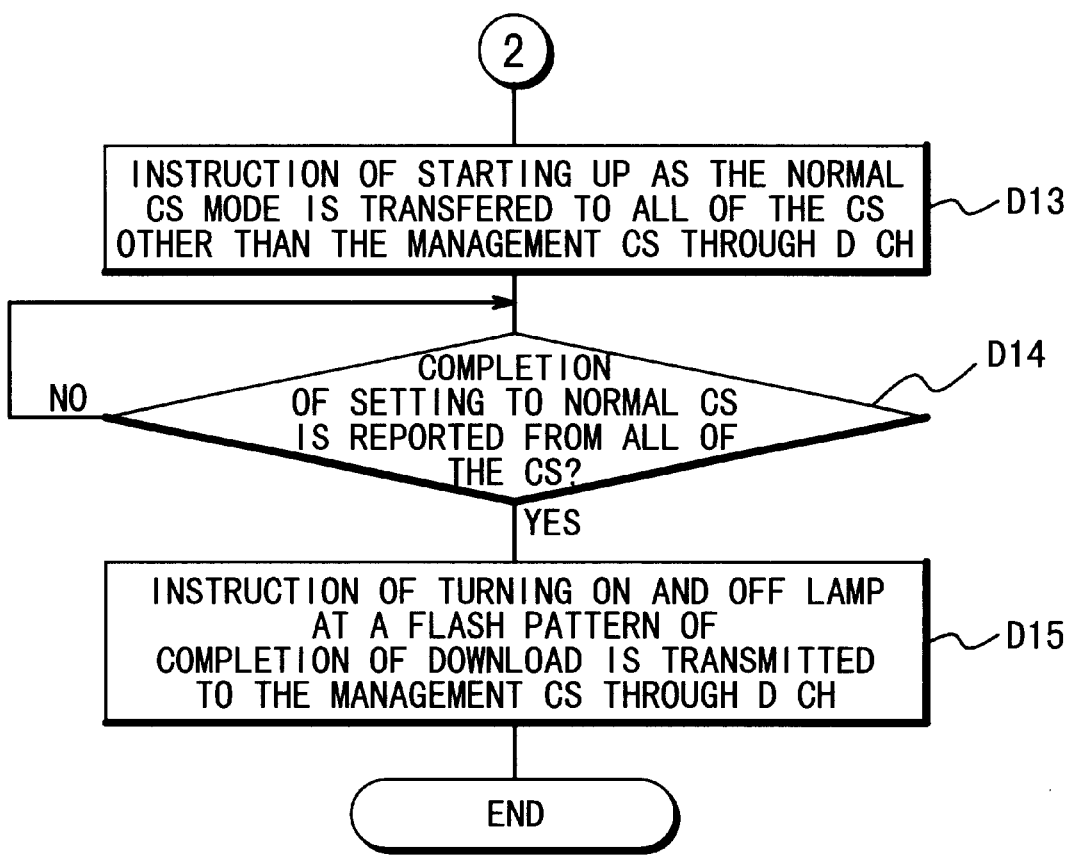
FIG. 10 is a flowchart describing a part of the operations of the private branch switching unit in the first embodiment.
Figure 11:
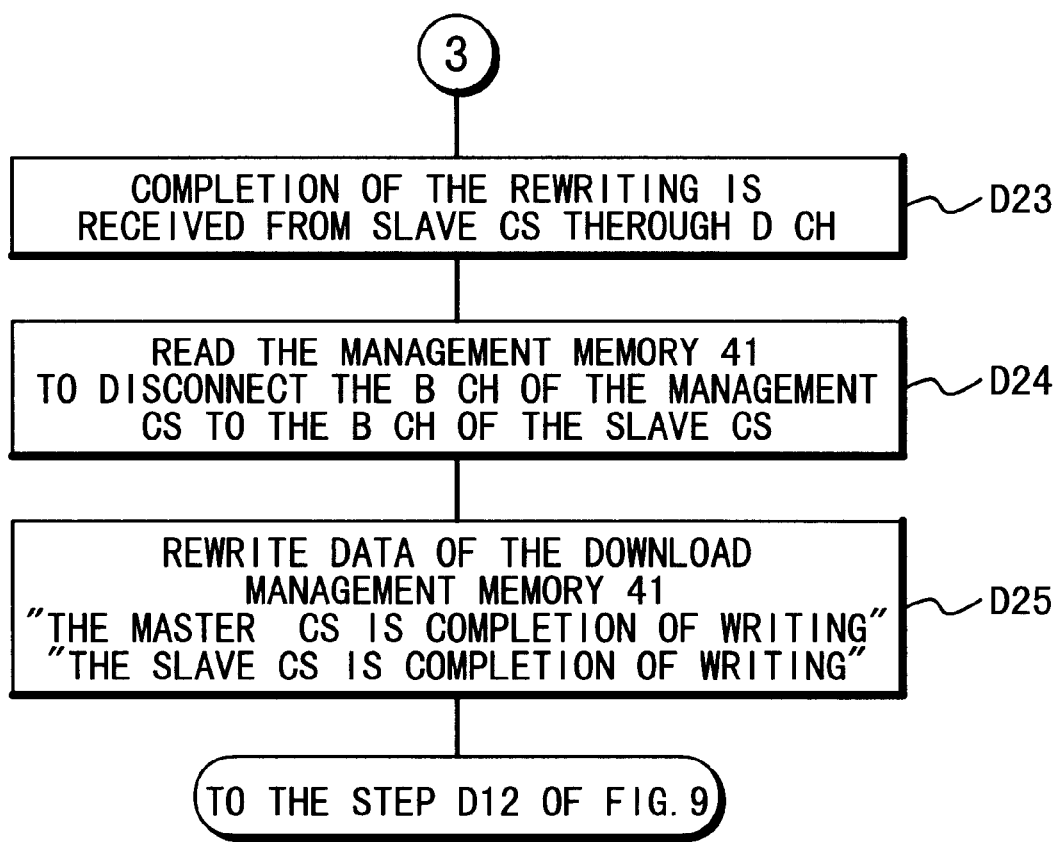
FIG. 11 is a flowchart describing a part of the operations of the private branch switching unit in the first embodiment.

The private branch switching unit 4, if receiving a normal mode set completion report from all the instructed private PHS radio base stations 2 (Step D14—YES), uses the lamp control unit 402 to then transmit the download completion lamp control signal through the control channel 351 to the management radio base station 3, and completes the download process (Step D15 of FIG. 10, and Steps A7 and A8 of FIG. 5).

Figure 9:
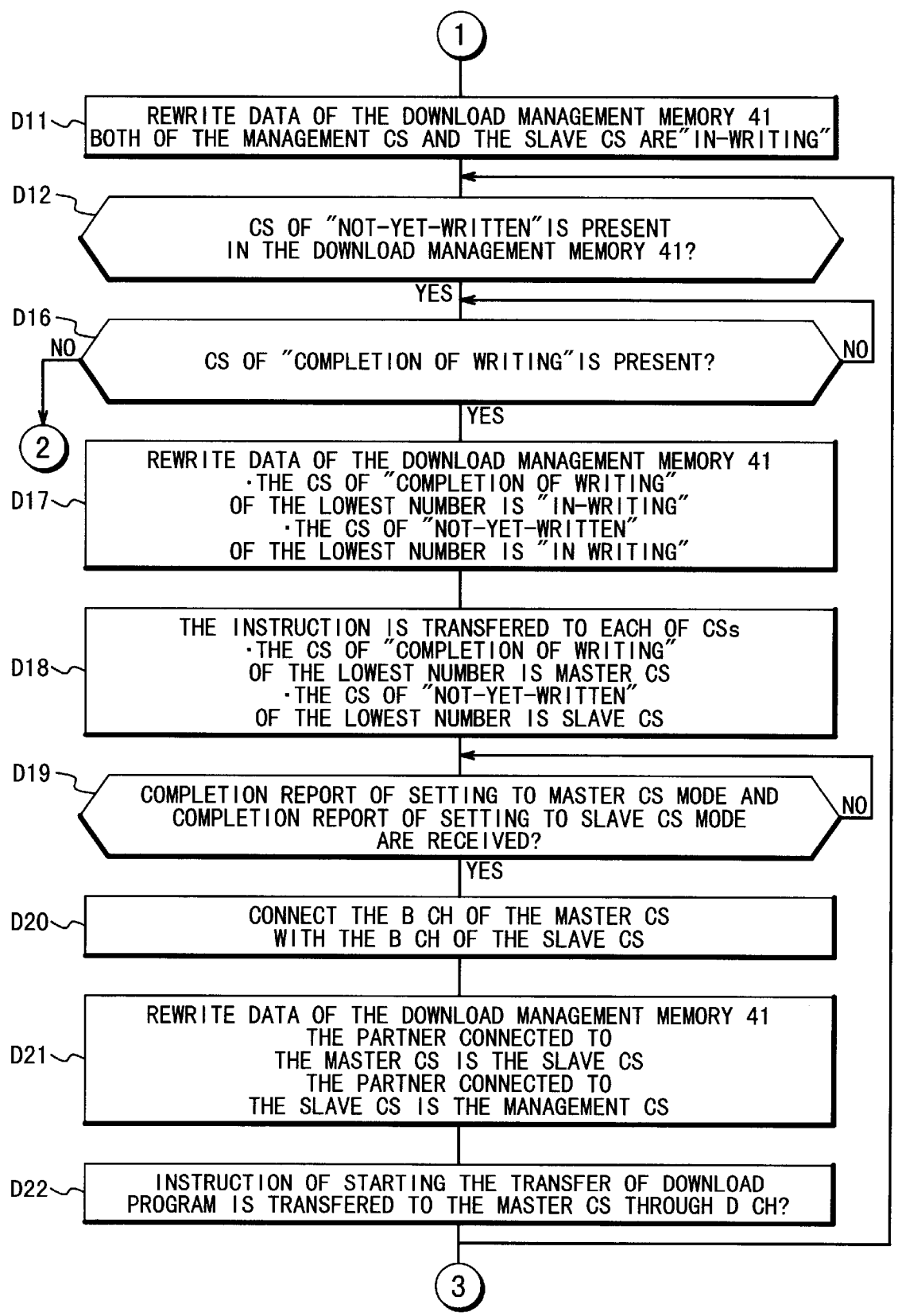
FIG. 9 is a flowchart describing a part of the operations of the private branch switching unit in the first embodiment.

At the steps D12 and D16 of FIG. 9, although there is the private PHS radio base station 2 in which the write state is the not-yet-written state (Step D12—YES), if there is not the private PHS radio base station 2 at the completion of writing state (Step D16—NO), the private branch switching unit 4 continues the retrieval until the detection of the private PHS radio base station 2 at the completion of writing state.

The private branch switching unit 4, if the private PHS radio base station 2 at the completion of writing state is detected (Step D16—YES), converts the data in the second memory areas 41B of the private PHS radio base station 2 at the completion of writing state and the private PHS radio base station 2 at the not-yet-written state (Step D12—YES) into the data at the in-writing state, in the CS download management memory 41 (Step D17).

Figure 7:
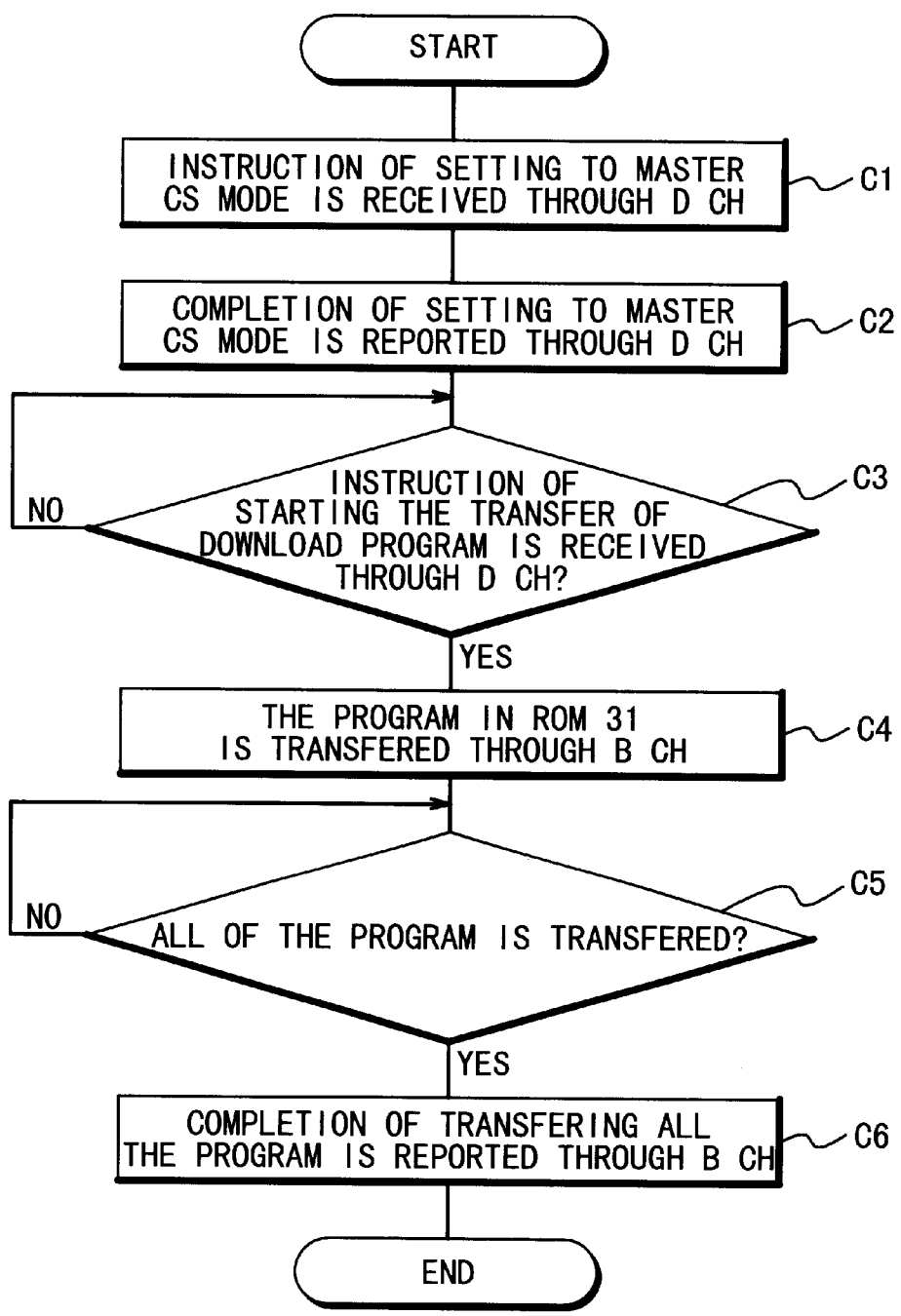
FIG. 7 is a flowchart describing operations of a radio base station (slave CS) set at a master CS mode in the first embodiment.

The private branch switching unit 4 assigns a master mode through the control channel 351 to the private PHS radio base station 2 at the completion of writing state, and assigns a slave mode to the private PHS radio base station 2 at the not-yet-written state (Step D18 of FIG. 9, Step B1 of FIG. 6 and Step Cl of FIG. 7).

The private branch switching unit 4, if receiving from both the master CS and the slave CS the respective mode set completion reports through the control channel 351 (Step D19—YES, Step B2 of FIG. 6 and Step C2 of FIG. 7), connects the master CS and the slave CS to each other through the call channel 352 (Step D20 of FIG. 9). The private branch switching unit 4 sets the CS numbers of the mutual connection destinations in the third memory areas 41C corresponding to the master CS and the slave CS connected to each other, in the CS download management memory 41 (Step D21 of FIG. 9).

Next, the private branch switching unit 4 sends the instruction of starting the transfer of the program through the control channel 351 to the master CS (refer to Step C3 of FIG. 7), and then returns back to the step S12 of FIG. 9 (Step D22 of FIG. 9).

Accordingly, after the download of the program is started between the master CS and the slave CS, the download can be executed between further different radio base stations in parallel. The private branch switching unit 4, if receiving the write completion report through the control channel 351 from the slave CS (Step D23 of FIG. 11, and Step B7 of FIG. 6), refers to the CS download management memory 41, and then disconnect the connection of the call channel 352 between the master CS and the slave CS (Step D24 of FIG. 11). The private branch switching unit 4 rewrites the data in the second memory area 41B of the slave CS and the master CS in the CS download management memory 41, into the completion of writing state, and then returns to the step D12 of FIG. 9 (Step D25 of FIG. 11).

This results in the increase of the number of the radio base stations at the completion of writing state. Thus, it can proceed to the step D17 of FIG. 9, if the private PHS radio base station 2 at the completion of writing state is retrieved at the steps D12, D16 of FIG. 9.

C. Another Embodiment

Figure 12:
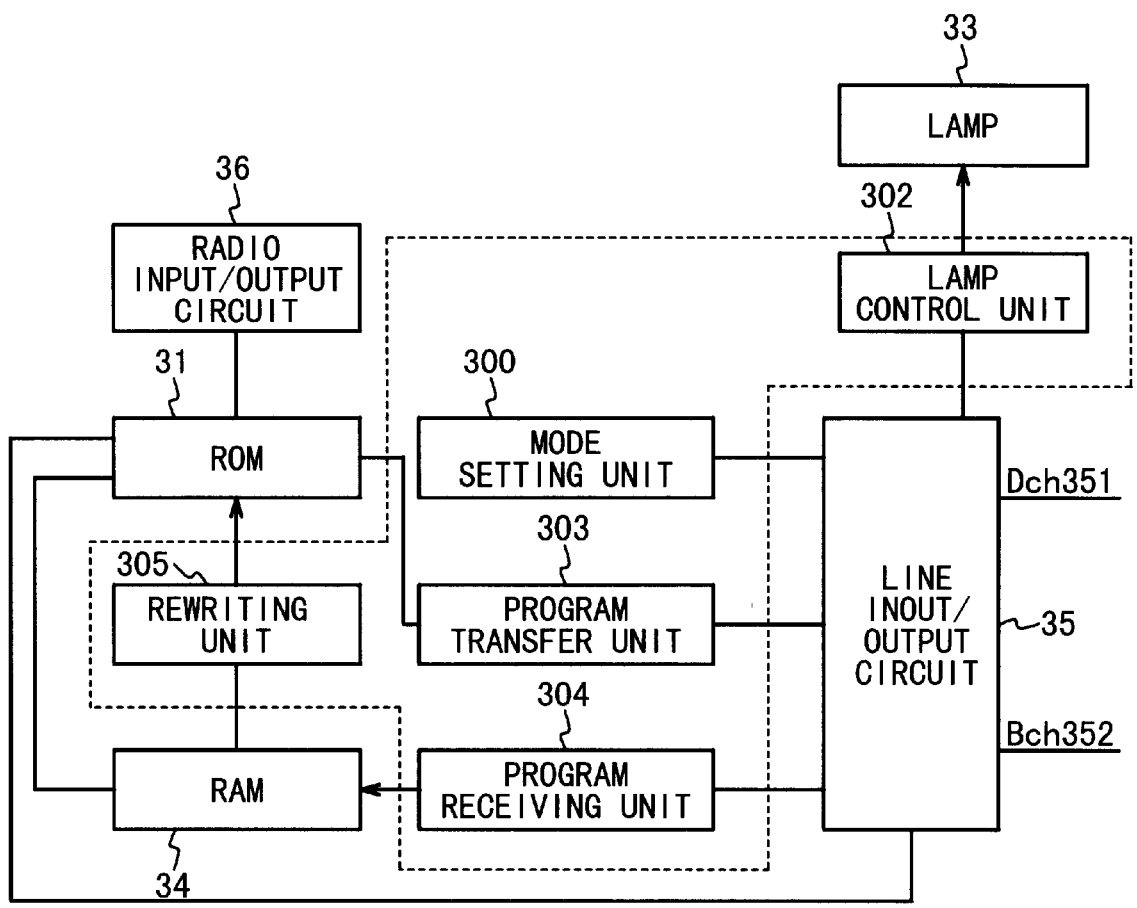
FIG. 12 is a block diagram showing a configuration of a radio base station in a second embodiment of the present invention.

A second embodiment of the present invention will be described below with reference to FIGS. 12 to 15. FIG. 12 is a block diagram showing a circuit configuration of a radio base station in the second embodiment. As shown in FIG. 12, the radio base station does not have a dip switch 32 and a reading unit 31, differently from the first embodiment shown in FIG. 2. That is, in the radio base station according to the second embodiment, a new program to be downloaded is written in advance to a ROM 31, in a management radio base station 3, similarly to the first embodiment. However, the management radio base station 3 of the second embodiment does not have a unit for reporting to a private branch switching unit 4 a fact that the intra-office (its radio base station) is the management radio base station 3. Also, the private branch switching unit 4 does not have a unit for recognizing the start of the CS download program by receiving the management CS starting up report from the management radio base station 3 (refer to Step A4 of FIG. 5).

Figure 13:
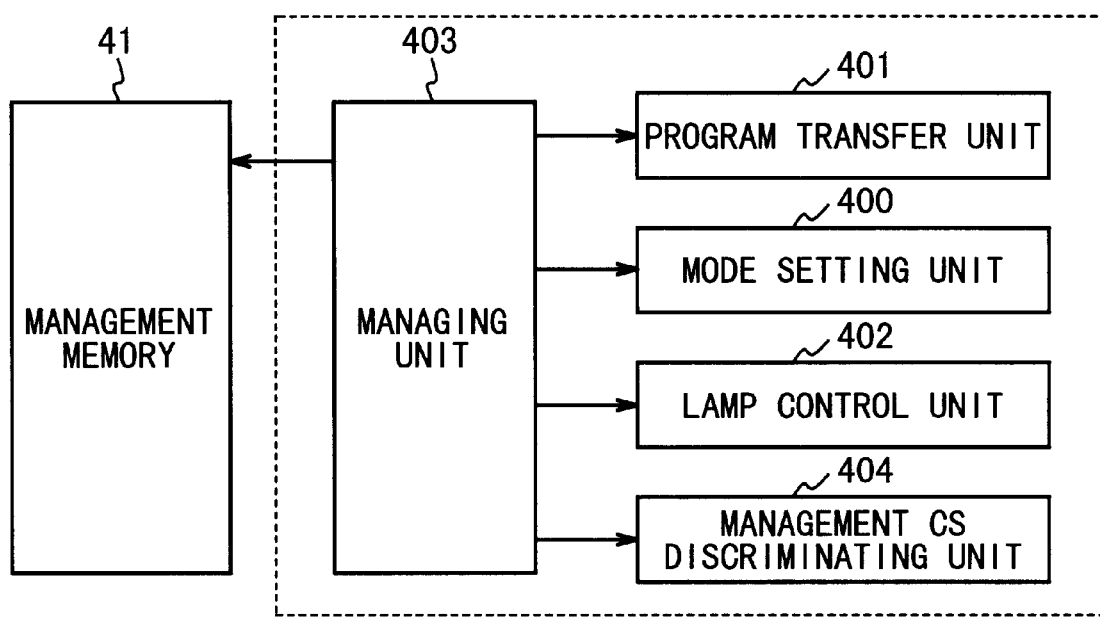
FIG. 13 is a block diagram showing a configuration of a private branch switching unit in the second embodiment of the present invention.

FIG. 13 is a block diagram showing the circuit configuration of the private branch switching unit 4 according to the second embodiment. As shown in FIG. 13, the private branch switching unit 4 has a management CS discriminating unit 404. The management CS discriminating unit 404 identifies an accommodation position of a radio base station to thereby specify whether the radio base station is the private PHS radio base station 2 or the management radio base station 3. The management CS discriminating unit 404 determines in advance that, for example, the lowest CS number of the private branch switching unit 4 is the management radio base station 3.

Figure 14:
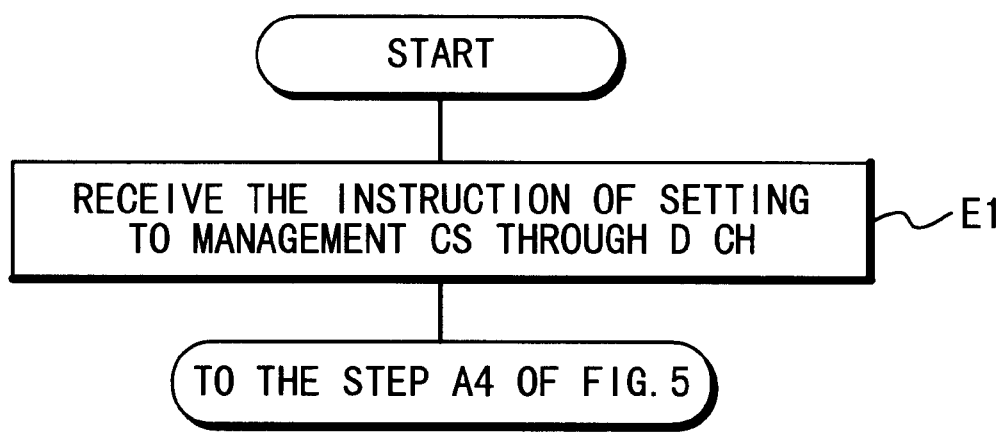
FIG. 14 is a flowchart describing operations of the radio base station in the second embodiment of the present invention.

The operations of the radio base station will be described below with reference to FIG. 14. If the radio base station is connected to the private branch switching unit 4, it is turned on and started up. Then, it receives an operation instruction at the management CS mode from the private branch switching unit 4 through the control channel 351 by using the line input/output circuit 35 (Step E1 of FIG. 14). Accordingly, the radio base station functions as the management radio base station 3. The operations on and after this step are perfectly identical to the above-mentioned operations of the management radio base station 3 according to the first embodiment, namely, those on and after the step A4 of FIG. 5. Thus, their explanations are omitted.

Figure 15:
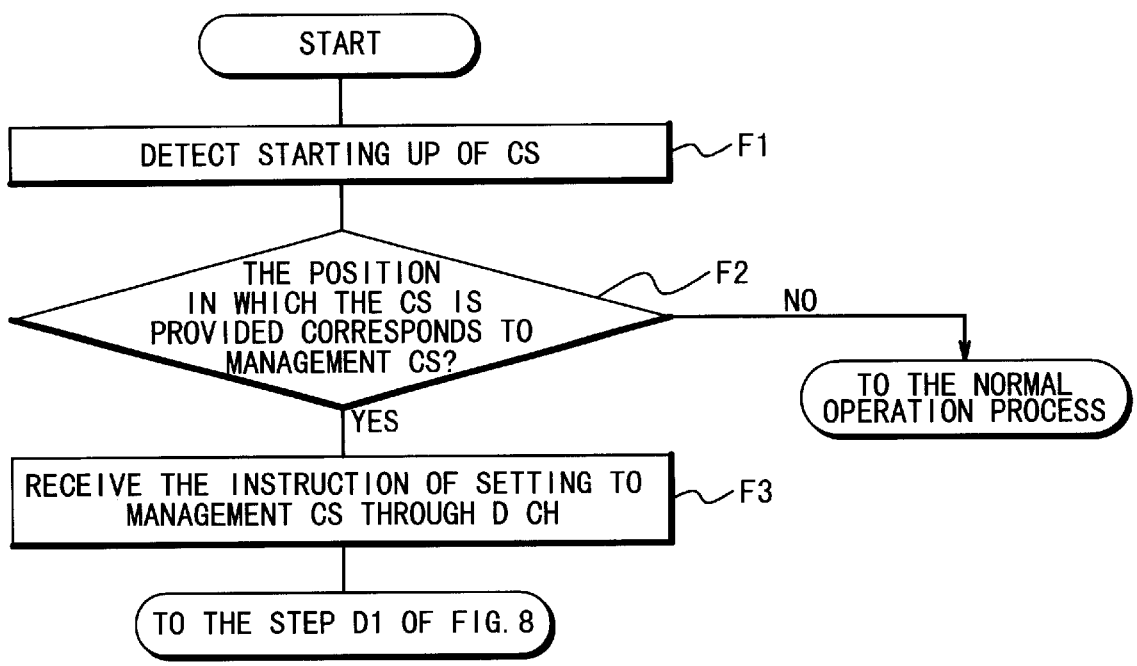
FIG. 15 is a flowchart describing operations of the private branch switching unit in the second embodiment of the present invention.

The operations of the private branch switching unit 4 will be described below with reference to FIG. 15. The private branch switching unit 4, when using the management CS discriminating unit 404 to then detect the starting up of the radio base station (Step F1 of FIG. 15), judges whether or not it is the management radio base station 3, on the basis of an accommodation position of the radio base station (Step F2). The private branch switching unit 4, if judging that it is the management radio base station 3 as the judged result, transmits an instruction indicative of the operation as the management radio base station 3 through the control channel 351 to the management radio base station 3 (Step F3 of FIG. 15). The operations on and after this step are perfectly identical to the above-mentioned operations of the private branch switching unit 4 according to the first embodiment, namely, those on and after the step D1 of FIG. 5. Thus, their explanations are omitted. Incidentally, the operations of the master CS and the slave CS are perfectly identical to the above-mentioned operations of FIGS. 6 and 7 according to the first embodiment.

As mentioned above, according to the present invention, in order to rewrite the program of the radio base station, it is enough to connect the management radio base station to the private branch switching unit. Thus, it is possible to obtain a merit that a specially managing apparatus is not necessary. Also, according to the present invention, since the radio base station receiving a new program sequentially functions as a master radio base station and then downloads to a non-updated radio base station, a plurality of downloads proceed at the same time. Therefore, it is possible to obtain a merit that the download programs can be completed in a short time, in a large number of radio base stations.

What is claimed is:

1. A program updating apparatus for a radio base station, comprising:
   a plurality of non-management radio base stations, wherein each of said plurality of non-management radio base stations has a first program;
   a management radio base station storing a second program to which said first program is updated; and
   a switching unit to which each of said plurality of non-management radio base stations and said management radio base station are connected, wherein said management radio base station transmits said second program to at least one of said plurality of non-management radio base stations such that said first program is updated to said second program, said non-management radio base station having said second program, as a first master radio base station, transmits said second program to another of said plurality of non-management radio base stations, as a first slave radio base station which does not have said second program, such that said first program is updated to said second program, said switching unit has a management table and refers to said management table to connect each of said plurality of non-management radio base stations and said management radio base station, said management table has a first memory area in which an identification number data assigned to each of said plurality of non-management radio base stations is stored and a second memory area in which a data indicative of a state of each of said plurality of non-management radio base stations is stored, said state data indicating whether or not said non-management radio base station has said second program and whether or not said non-management radio base station is transmitting or receiving said second program, and said switching unit refers to said second memory area to retrieve said state data indicating that said non-management radio base station does not have said second program and said state data indicating that said non-management radio base station has said second program, and selects said master radio base station and said slave radio base station based on said retrieved result to connect aid selected said master radio base station to said selected slave radio base station.

2. A program updating apparatus according to claim 1, wherein:

an identification number data assigned to said management radio base station is further stored in said first memory area;

said state data of said management radio base station is further stored in said second memory area; and said management table further has a third memory area in which a data is stored, said data being indicative of a communication destination when said second program should be transmitted.

3. A program updating apparatus for a radio base station, comprising:

a plurality of non-management radio base stations, wherein each of said plurality of non-management radio base stations has a first program;

a management radio base station storing a second program to which said first program is updated; and wherein said management radio base station transmits said second program to at least one of said plurality of non-management radio base stations such that said first program is updated to said second program;

a mode setting unit in each of said management radio base station and said plurality of non-management radio base stations, said mode setting unit setting as an operation mode one of a management radio base station mode, a master radio base station mode, and a slave radio base station mode; and a switching unit connected to each said non-management radio base station and said management radio base station, said non-management radio base station having said second program, as a first master radio base station, transmits said second program to another of said plurality of non-management radio base stations, as a first slave radio base station which does not have said second program, such that said first program is updated to said second program, each of said plurality of non-management radio base stations and said management radio base station have a substantially same circuit configuration other than a fact that said second program is stored in said management radio base station in advance, said mode setting unit of said management radio base station sets to said management radio base station mode in advance to output a first data indicating that said management radio base station is in said management radio base station mode to said switching unit, said switching unit outputs a mode setting signal to designate said master radio base station and said slave radio base station in response to said first data, and said mode setting unit of each non-management radio base station sets to any one of said master radio base station mode and said slave radio base station mode based on said mode setting signal.

4. A program updating apparatus for a radio base station, comprising:

a plurality of non-management radio base stations, wherein each of said plurality of non-management radio base stations has a first program;

a management radio base station storing a second program to which said first program is updated; and wherein said management radio base station transmits said second program to at least one of said plurality of non-management radio base stations such that said first program is updated to said second program;

a mode setting unit in said management radio base station and each of said plurality of non-management radio base stations, said mode setting unit setting as an operation mode one of a management radio base station mode, a master radio base station mode, and a slave radio base station mode; and a switching unit connected to said non-management radio base station and each said management radio base station, said non-management radio base station having said second program, as a first master radio base station, transmits said second program to another of said plurality of non-management radio base stations, as a first slave radio base station which does not have said second program, such that said first program is updated to said second program, each of said plurality of non-management radio base stations and said management radio base station have a substantially same circuit configuration other than that said second program is stored in said management radio base station in advance, said management radio base station is connected to said switching unit at a predetermined position, said switching unit identifies said management radio base station based on said position, said switching unit outputs a mode setting signal to designate said master radio base station and said slave radio base station in response to said program update, and said mode setting unit of each non-management radio base station sets to any one of said master radio base station mode and said slave radio base station mode based on said mode setting signal.

5. A program updating method of a radio base station, comprising:
   (a) providing a plurality of non-management radio base stations, wherein each of said plurality of non-management radio base stations has a first program;
   (b) providing a management radio base station storing a second program to which said first program is updated;
   (c) setting any one of said plurality of non-management radio base stations as an N-th (N is an integer equal to or more than 1) slave radio base station;
   (d) transmitting said second program to said N-th slave radio base station from said management radio base station to update said first program of said N-th slave radio base station to said second program;
   (e) setting said N-th slave radio base station having said second program as an M-th (M is an integer equal to or more than 1) master radio base station;
   (f) setting any one of said plurality of non-management radio base stations which does not have said second program, as an (N+1)-th slave radio base station;
   (g) transmitting said second program to said (N+1)-th slave radio base station from said M - th master radio base station to update said first program of said (N+1)-th slave radio base station to said second program;
   (h) setting said (N+1)-th slave radio base station having said second program as an (M+1)-th master radio base station;
   (i) setting any one of said plurality of non-management radio base stations which does not have said second program as an (N+2)-th slave radio base station;
   (j) transmitting said second program to said (N+2)-th slave radio base station from said (M+1)-th master radio base station to update said first program of said (N+2)-th slave radio base station to said second program; and
   (l) assigning an identification number to each of said plurality of non-management radio base stations and said management radio base station,
      wherein said (c) step includes setting a non-management radio base station having a lowest identification number of said plurality of non-management radio base stations, as said N-th slave radio base station, and
      said (i) step includes setting a non-management radio base station having a lowest identification number of said plurality of non-management radio base stations, as said (N+2)-th slave radio base station.

6. A program updating method of a radio base station, comprising:
   (a) providing a plurality of non-management radio base stations, wherein each of said plurality of non-management radio base stations has a first program;
   (b) providing a management radio base station storing a second program to which said first program is updated;
   (c) setting any one of said plurality of non-management radio base stations as an N-th (N is an integer equal to or more than 1) slave radio base station;
   (d) transmitting said second program to said N-th slave radio base station from said management radio base station to update said first program of said N-th slave radio base station to said second program;
   (e) setting said N-th slave radio base station having said second program as an M-th (M is an integer equal to or more than 1) master radio base station;
   (f) setting any one of said plurality of non-management radio base stations which does not have said second program, as an (N+1)-th slave radio base station;
   (g) transmitting said second program to said (N+1)-th slave radio base station from said M-th master radio base station to update said first program of said (N+1)-th slave radio base station to said second program;
   (m) providing a management table, wherein said management table stores an identification number assigned to each of said plurality of non-management radio base stations and a data indicating whether or not each non-management radio base station has said second program;
   (n) referring to said management table to generate a referring result;
   (o) retrieving, based on said referring result, a non-management radio base station having a lowest identification number of said plurality of non-management radio base stations which have said second program, as said master radio base station;
   (p) retrieving, based on said referring result, a non-management radio base station having a lowest identification number of said plurality of non-management radio base stations which do not have said second program, as said slave radio base station; and
   (q) transmitting said second program to said retrieved slave radio base station from said retrieved master radio base station to update said first program to said second program.

* * * * *